(12) United States Patent
Hayata

(10) Patent No.: US 6,240,298 B1
(45) Date of Patent: May 29, 2001

(54) METHOD FOR EASING CONGESTION IN A MOBILE COMMUNICATION SYSTEM BY TEMPORARILY CONVERTING A CONTROL CHANNEL TO A CONVERSATION CHANNEL

(75) Inventor: Yasunobu Hayata, Yokohama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/112,298

(22) Filed: Jul. 9, 1998

(30) Foreign Application Priority Data

Jul. 14, 1997 (JP) .................................................. 9-188722

(51) Int. Cl.$^7$ ...................................................... H04Q 7/20
(52) U.S. Cl. ........................... 455/511; 455/452; 455/453
(58) Field of Search ..................................... 455/511, 512, 455/509, 516, 450, 451, 452, 453, 455; 370/330

(56) References Cited

U.S. PATENT DOCUMENTS

| | | | |
|---|---|---|---|
| 5,239,678 | * | 8/1993 | Grube et al. ........................... 455/511 |
| 6,023,460 | * | 2/2000 | Jackson et al. ....................... 370/330 |

FOREIGN PATENT DOCUMENTS

| | | |
|---|---|---|
| 61-13827 | 1/1986 | (JP) . |
| 61-49529 | 3/1986 | (JP) . |
| 63-9321 | 1/1988 | (JP) . |
| 63-105538 | 5/1988 | (JP) . |
| 2-179039 | 7/1990 | (JP) . |
| 3-17418 | 3/1991 | (JP) . |
| 3-128537 | 5/1991 | (JP) . |
| 4-360428 | 12/1992 | (JP) . |
| 7-143552 | 6/1995 | (JP) . |
| 7-336756 | 12/1995 | (JP) . |
| 8-19031 | 1/1996 | (JP) . |
| 9-284862 | 10/1997 | (JP) . |
| 9310600 | 5/1993 | (WO) . |
| 9310643 | 5/1993 | (WO) . |
| 9519687 | 7/1995 | (WO) . |
| 9716931 | 5/1997 | (WO) . |

* cited by examiner

Primary Examiner—William G. Trost
Assistant Examiner—Philip J. Sobutka
(74) Attorney, Agent, or Firm—Ostrolenk, Faber, Gerb & Soffen, LLP

(57) ABSTRACT

A conversation channel allocation method is provided for a mobile communication system of MCA method to perform allocation of conversation channels between base stations and mobile stations. At a congestion state where all of the conversation channels are used for conversations respectively, when a new conversation request is given from a mobile station, a control channel, which is originally used for transmission of a control signal, is allocated to such a mobile station as a new conversation channel. Thus, the mobile station is capable of performing radio communication with the base station by using the control channel, so that a calling party is capable of performing conversation with a called party without interruption. When the conversation completes, the control channel is restored by canceling its function as the new conversation channel. If any one of the conversation channels ends conversation prior to completion of the conversation using the control channel so that it is now placed as a vacant conversation channel, the control channel is restored by canceling its function as the new conversation channel while such a vacant conversation channel is used for the conversation of the mobile station. Incidentally, in order to avoid jamming, the base station transmits a signal of low frequency tone, which is out of a prescribed conversation band, to other mobile stations to inform of utilization of the control channel for the conversation of the mobile station, while adjacent base stations stop transmitting control signals.

2 Claims, 2 Drawing Sheets

FIG.1A

| CHANNEL 1 | CONTROL IN PROGRESS |
| CHANNEL 2 | VACANT |
| CHANNEL 3 | VACANT |
| CHANNEL 4 | VACANT |

FIG.1B

| CHANNEL 1 | CONTROL IN PROGRESS | |
| CHANNEL 2 | CONVERSATION IN PROGRESS | CONVERSATION 1 |
| CHANNEL 3 | CONVERSATION IN PROGRESS | CONVERSATION 2 |
| CHANNEL 4 | CONVERSATION IN PROGRESS | CONVERSATION 3 |

FIG.1C

| CHANNEL 1 | CONVERSATION IN PROGRESS | CONVERSATION 4 |
| CHANNEL 2 | CONVERSATION IN PROGRESS | CONVERSATION 1 |
| CHANNEL 3 | CONVERSATION IN PROGRESS | CONVERSATION 2 |
| CHANNEL 4 | CONVERSATION IN PROGRESS | CONVERSATION 3 |

FIG.1D

| CHANNEL 1 | CONTROL IN PROGRESS | |
| CHANNEL 2 | CONVERSATION IN PROGRESS | CONVERSATION 1 |
| CHANNEL 3 | CONVERSATION IN PROGRESS | CONVERSATION 4 |
| CHANNEL 4 | CONVERSATION IN PROGRESS | CONVERSATION 3 |

TRANSFER CONVERSATION 4 FROM CHANNEL 1 TO CHANNEL 3

METHOD FOR EASING CONGESTION IN A MOBILE COMMUNICATION SYSTEM BY TEMPORARILY CONVERTING A CONTROL CHANNEL TO A CONVERSATION CHANNEL

BACKGROUND OF THE INVENTION

1. Field of the Invention

This invention relates to conversation channel allocation methods applicable to mobile communication systems based on the MCA method using control channels. This application is based on patent application No. Hei 9-188722 filed in Japan, the content of which is incorporated herein by reference.

2. Description of the Related Art

It is well known in the mobile communication systems of the MCA method that control channels are fixedly used for transmission of control signals while conversation channels are fixedly used for conversation. Each mobile station performs radio communication using any one of the control channels with respect to a base station, so that a calling party is capable of performing conversation with a called party. Herein, the conversation channel is selected from among prescribed conversation channels, which are prepared in advance. So, a selected conversation channel is allocated to each mobile station.

As described above, the conventional mobile communication systems are designed in such a manner that the conversation channels are fixed. So, if a number of the used conversation channels reaches a maximum number of channels in response to an increase of traffic, a congested state occurs, which causes the problem in which a new mobile station cannot start conversation.

SUMMARY OF THE INVENTION

It is an object of the invention to provide a conversation channel allocation method that enables a new mobile station to start conversation even if all of the conversation channels are currently being used for conversations in a mobile communication system.

This invention provides a conversation channel allocation method for a mobile communication system of MCA method that performs allocation of conversation channels between base stations and mobile stations. During a congestion state in which all of the conversation channels are currently being used for conversations, when a new conversation request is given from a mobile station, a control channel, which is originally used for transmission of a control signal, is allocated to that mobile station as a new conversation channel. Thus, the mobile station is capable of performing radio communication with the base station by using the control channel, so that a calling party is capable of performing conversation with a called party without interruption.

When the conversation is completed, the control channel is restored by canceling its function as the new conversation channel. If any one of the conversation channels ends conversation prior to completion of the conversation using the control channel so that it now becomes a vacant conversation channel, the control channel is restored by canceling its function as the new conversation channel while the vacant conversation channel is allocated to the conversation that was being carried by the control channel.

In order to avoid jamming, the base station transmits a signal of low frequency tone, which is out of range of a prescribed conversation band, to other mobile stations to inform them that of the control channel is being utilized for a conversation by a mobile station, so that the other mobile stations will display a message of "conversation in progress", for example. In addition, adjacent base stations stop transmitting control signals, so that their mobile stations will display a message of "out of communication service range", for example.

BRIEF DESCRIPTION OF THE DRAWINGS

These and other objects, aspects and embodiments of the present invention will be described in more detail with reference to the following drawing figures, of which:

FIG. 1A, FIG. 1B, FIG. 1C and FIG. 1D show channel utilization states, which are used to explain a preferred embodiment of a conversation channel allocation method of a mobile communication system in accordance with the invention.

DESCRIPTION OF THE PREFERRED EMBODIMENT

Figure 2:
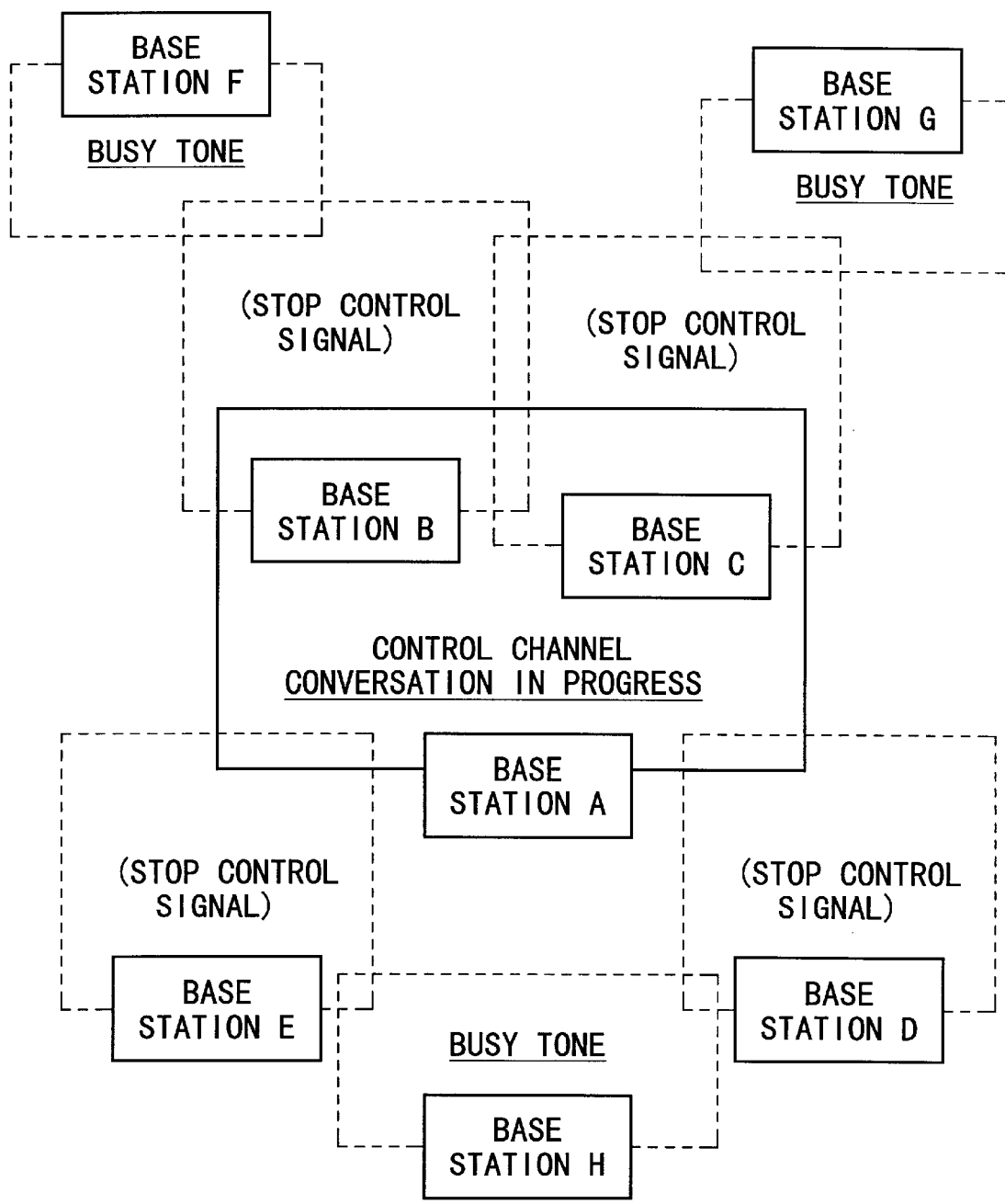
FIG. 2 is a system diagram showing the mobile communication system using several base stations, which provide measures to avoid jamming due to utilization of a control channel for conversation in accordance with the invention.

This invention will be described in further detail by way of example with reference to the accompanying drawings.

FIG. 1A, FIG. 1B, FIG. 1C and FIG. 1D show channel utilization states in a mobile communication system to which a preferred embodiment of the conversation channel allocation method is applicable. For convenience' sake, the above drawings are provided with regard to an example in which the mobile communication system uses four channels designated by "channel 1", "channel 2", "channel 3", and "channel 4", respectively. However, this invention is applicable to other examples of the mobile communication system which use a greater number of channels.

In a state as shown in FIG. 1A, channel 1 is used as a control channel to send a control signal, while channels 2 to 4 are used as conversation channels, none of which is in use now.

In a state as shown in FIG. 1B, channel 2 is allocated to conversation 1; channel 3 is allocated to conversation 2; and channel 4 is allocated to conversation 3.

When a new conversation request (i.e., call request) is made in the state of FIG. 1B, channel 1 which is originally used as the control channel is allocated to conversation 4 corresponding to the new conversation request, which is shown in FIG. 1C.

When conversation 4 is completed, channel 1 switches its function thereof from a conversation channel back to the control channel, so that the state of FIG. 1C is returned to the state of FIG. 1B.

However, if any one of conversations 1 to 3 ends prior to completion of conversation 4, conversation 4 proceeds on the vacant channel so that channel 1 switches its function thereof from a conversation channel back to the control channel, as shown in FIG. 1D.

As described above, the present embodiment is designed such that in the case of a shortage of conversation channels, the control channel is used as a conversation channel. In the case where such a control is made, however, it is necessary to provide some measure to avoid jamming between the conversation on the control channel and a registered control signal from the mobile station.

Next, a description will be given with respect to the measure to avoid jamming in the present embodiment with reference to FIG. 2.

Suppose an example in which a base station A performs conversation using a control channel with a mobile station. In such an example, the base station A transmits a signal using a low frequency tone which is out of the prescribed conversation band with respect to other mobile stations under the control of the base station A. Thus, the base station A communicates with the other mobile stations to inform the of the utilization of the control channel. In addition, the base station A controls the other mobile stations to perform a display of "conversation in progress", for example. As a result, adjacent base stations (i.e., base stations B, C, D and E) do not perform sending of control signals. Thus, mobile stations, which are under the control of the adjacent base stations perform a display of "out of communication service range", for example. In addition, further adjacent base stations (i.e., base stations F, G and H) located further adjacent to the adjacent base stations send a busy tone using the control channel. The further adjacent base stations inform the respective mobile stations thereof of the progression of any conversations that other base stations perform using the control channel. So, the mobile stations perform a display of "conversation in progress".

By the above controlling of the mobile stations under the respective base stations, it is possible to avoid the occurrence of jamming.

According to the present embodiment of the invention, the control channel is used as a conversation channel in the case where a shortage of conversation channels occurs, so that there is provided a remarkable effect in which congestion of lines can be automatically released.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or any equivalence of such metes and bounds are therefore intended to be embraced by the claims.

What is claimed is:

1. A conversation channel allocation method for a mobile communication system in which a base station sends a control signal to a mobile station by way of a control channel while the mobile station uses a conversation channel to perform radio communication with the base station so that communication is established between a calling party and a called party, said conversation channel allocation method comprising the steps of detecting congestion of conversation channels in the base station;

during congestion of the conversation channels, allocating the control channel as a new conversation channel for a requesting mobile station, wherein while the control channel is being used as a conversation channel, the base station transmits a tone whose frequency range is out of a prescribed conversation band and an adjacent base station adjacent to the base station stops using the control channel, and wherein a further adjacent base station further adjacent to the adjacent base station transmits a busy tone.

2. A conversation channel allocation method for a mobile communication system in which a mobile station performs radio communication with a base station, said conversation channel allocation method comprising the steps of:

detecting a congested state in which all conversation channels are currently being used for conversation;

allocating a control channel to the mobile station as a new conversation channel in response to a new conversation request from the mobile station during the congested state;

transmitting a signal of low frequency tone which is out of range of a prescribed conversation band, to another mobile station to inform the another mobile station that the control channel is being used for conversation;

controlling an adjacent base station, which is adjacent to the base station that communicates with the mobile station using the control channel for conversation, to stop transmitting a control signal, whereby an occurrence of jamming is avoided; and restoring the control channel by canceling its function as a conversation channel upon first occurrence of one of the conversations ending, such that if the ended conversation results in a vacant conversation channel, the conversation carried by the control channel prior to the control channel being restored is transferred to the vacant conversation channel.

* * * * *